(12) United States Patent
San Martin

(10) Patent No.: US 10,954,779 B2
(45) Date of Patent: Mar. 23, 2021

(54) BOREHOLE WALL IMAGING TOOL HAVING A GROOVED WALL-CONTACTING FACE

(71) Applicant: HALLIBURTON ENERGY SERVICES, INC., Houston, TX (US)

(72) Inventor: Luis Emilio San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/118,464

(22) PCT Filed: Apr. 8, 2014

(86) PCT No.: PCT/US2014/033355
§ 371 (c)(1),
(2) Date: Aug. 11, 2016

(87) PCT Pub. No.: WO2015/156784
PCT Pub. Date: Oct. 15, 2015

(65) Prior Publication Data
US 2017/0145806 A1    May 25, 2017

(51) Int. Cl.
*G01V 3/20*     (2006.01)
*E21B 47/12*    (2012.01)
*E21B 49/00*    (2006.01)

(52) U.S. Cl.
CPC ............. *E21B 47/12* (2013.01); *E21B 49/00* (2013.01); *G01V 3/20* (2013.01)

(58) Field of Classification Search
CPC ... G01V 3/18; G01V 3/20; G01V 3/24; G01V 3/26; G01V 3/34; G01V 3/36; G01V 3/00;
(Continued)

(56) References Cited

U.S. PATENT DOCUMENTS

| 2,921,253 A | * | 1/1960 | Liben | G01V 3/26 |
| | | | | 324/221 |
| 3,007,107 A | * | 10/1961 | Gondouin | G01V 3/24 |
| | | | | 324/342 |

(Continued)

FOREIGN PATENT DOCUMENTS

WO    2015/156784    10/2015

OTHER PUBLICATIONS

European Search Report for International Application No. PCT/US2014/033355 dated Sep. 15, 2017.
(Continued)

*Primary Examiner* — David M Schindler
(74) *Attorney, Agent, or Firm* — John Wusterberg; C. Tumey Law Group PLLC

(57) ABSTRACT

Various disclosed borehole imaging tools and methods provide an improved high-resolution electrode configuration suitable for imaging in both water-based and oil-based muds. In at least some embodiments, the imaging tools employ a unitary conductive body to provide a wall-contacting face with grooves that define multiple sensing surfaces. Toroids may be seated in the grooves around each sensing surface for measuring the current flow through each sensing surface. Such placement enables a nearly ideal equipotential surface to be maintained and a straightforward "full coverage" electrode configuration due to a minimal electrode separation. Moreover, the disclosed configuration promises robust and reliable performance in the hostile conditions often experienced by logging while drilling (LWD) tools. This wall-contacting face can be provided on an extendable sensor pad or embedded on the outer surface of a LWD stabilizer fin.

24 Claims, 4 Drawing Sheets

(58) Field of Classification Search
CPC ... G01V 3/02; G01V 3/04; G01V 3/06; G01V 3/08; E21B 47/002; E21B 47/01; E21B 47/12; E21B 17/1078; E21B 49/00
See application file for complete search history.

(56) References Cited

U.S. PATENT DOCUMENTS

| | | | |
|---|---|---|---|
| 3,060,373 A * | 10/1962 | Henri-Georges Doll | G01V 3/20 324/374 |
| 3,818,324 A * | 6/1974 | Espinasse | G01V 3/20 324/347 |
| 4,630,243 A | 12/1986 | MacLeod | |
| 5,191,290 A * | 3/1993 | Gianzero | G01V 3/20 324/374 |
| 6,191,588 B1 | 2/2001 | Chen | |
| 6,600,321 B2 | 7/2003 | Evans | |
| 7,098,664 B2 | 8/2006 | Bittar et al. | |
| 2003/0155925 A1* | 8/2003 | Tabarovsky | G01V 3/24 324/374 |
| 2005/0133262 A1 | 6/2005 | Chen et al. | |
| 2006/0208738 A1 | 9/2006 | Moore | |
| 2008/0018335 A1* | 1/2008 | Chemali | G01V 3/20 324/367 |
| 2009/0278543 A1 | 11/2009 | Beste et al. | |
| 2010/0295548 A1* | 11/2010 | Georgi | G01V 3/24 324/355 |
| 2011/0204897 A1 | 8/2011 | Hu et al. | |
| 2011/0221442 A1 | 9/2011 | Maurer et al. | |
| 2011/0221443 A1* | 9/2011 | Bittar | G01V 3/30 324/339 |
| 2015/0012217 A1* | 1/2015 | Legendre | E21B 47/082 702/7 |

OTHER PUBLICATIONS

Fam, M.Y. et al., "Applying Electrical Micro-Imaging Logs to Reservoir Characterization", *"Applying Electrical Micro-Imaging Logs to Reservoir Characterization" M.Y. Fam, R. Chemali, D. Seiler, M. Haugland, Halliburton Energy Services, and W.F. Stewart, Chevron, SPE 30608, 1995*, (1995),12 pgs.
Prammer, Manfred G. et al., "Field Testing of an Advanced LWD Imaging/Resistivity Tool", *"Field Testing of Advanced LWD Imaging Resistivity Tool", M.G. Prammer, M. Morys, S. Knizhnik, C.J. Conrad, W.E. Hendricks, M.S. Bittar, G.Hu, F. Hveding, K.Kenny, R.M. Shokeir, D.J. Seifert, P.M. Neumann and S. Al-Dossari, SPWLA 48th, paper AA, 2007*, (2007),15 pgs.
PCT International Search Report & Written Opinion, dated Jan. 7, 2015, Appl No. PCT/US2014/033355, "Borehole Wall Imaging Tool Having A Grooved Wall-Contacting Face", filed Apr. 8, 2014, 15 pgs.

* cited by examiner

Fig. 1
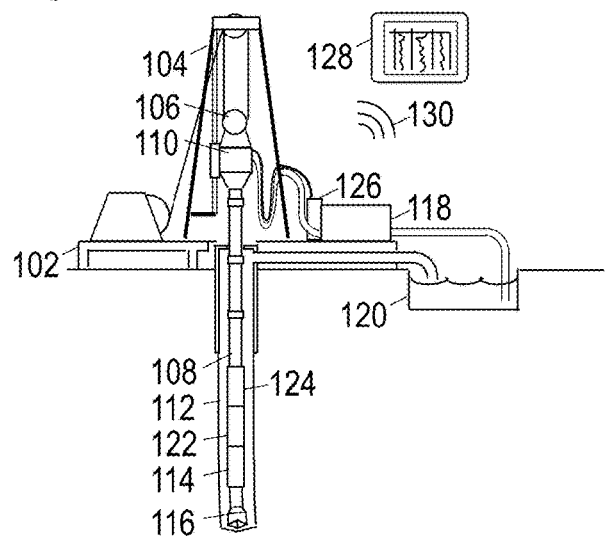
Fig. 2
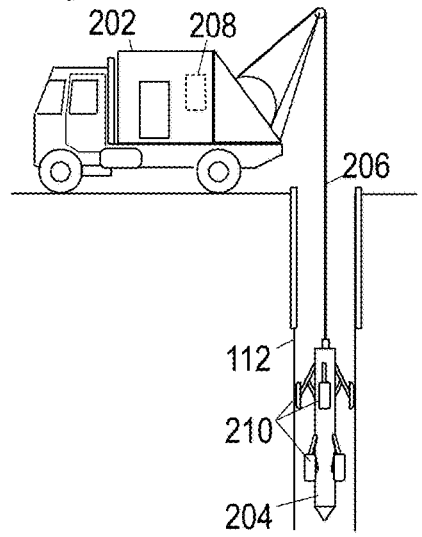
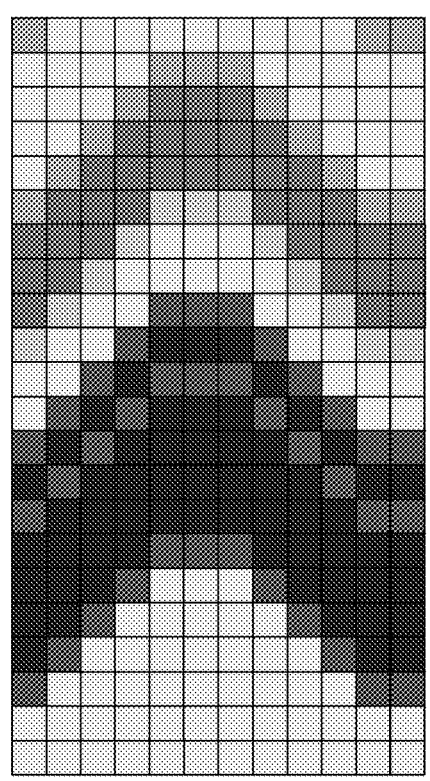
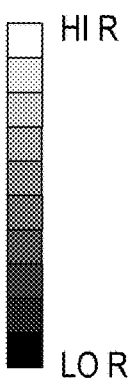
Fig. 3

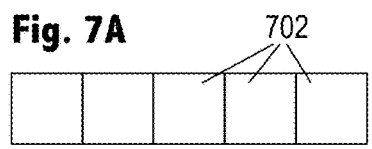
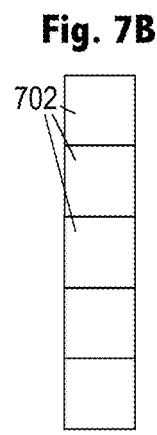
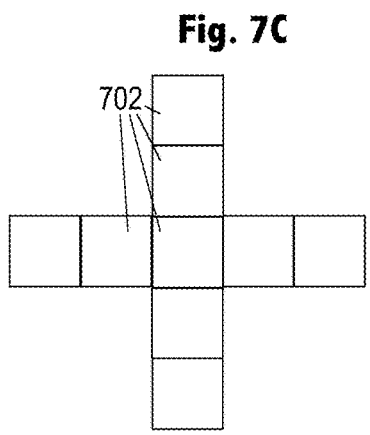
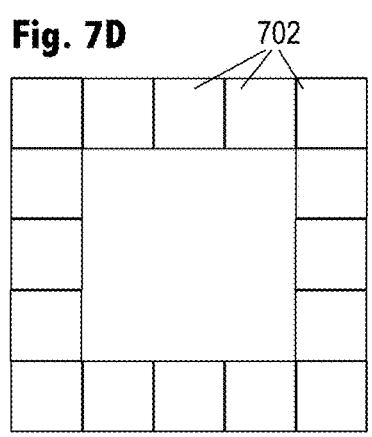
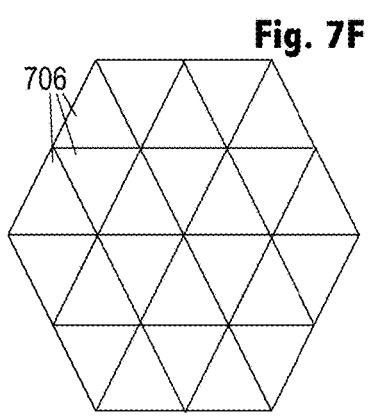
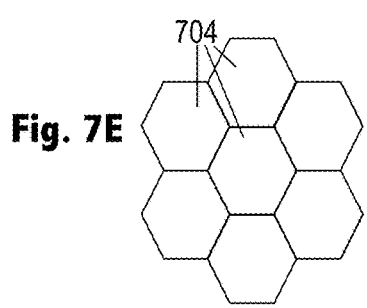
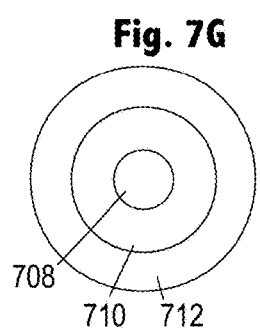
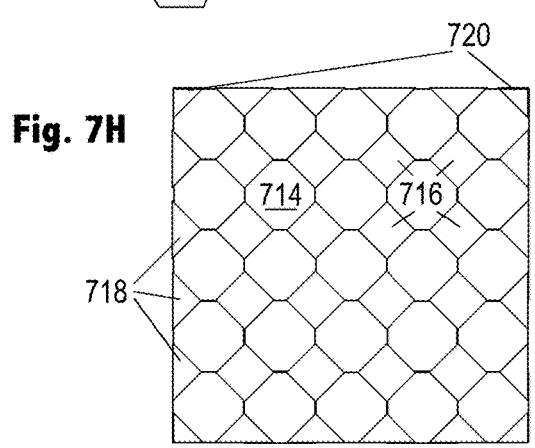
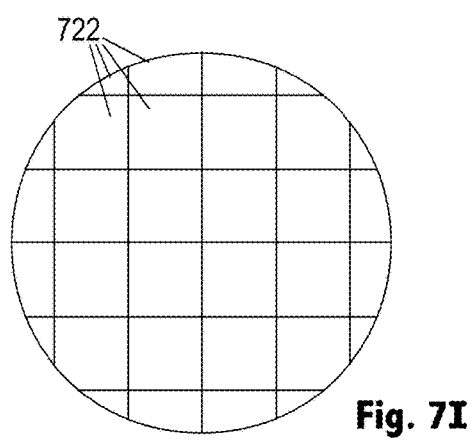

BOREHOLE WALL IMAGING TOOL HAVING A GROOVED WALL-CONTACTING FACE

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging and "logging while drilling" (LWD).

In wireline logging, a probe or "sonde" is lowered into the borehole after some or the entire well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated. While LWD techniques allow more contemporaneous formation measurements, drilling operations create an environment that is generally hostile to electronic instrumentation and sensor operations.

In these and other logging environments, it is desirable to construct an image of the borehole wall. Among other things, such images reveal the fine-scale structure of the penetrated formations. The fine-scale structure includes stratifications such as shale/sand sequences, fractures, and non-homogeneities caused by irregular cementation and variations in pore size. Orientations of fractures and strata can also be identified, enabling more accurate reservoir flow modeling.

Borehole wall imaging can be accomplished in a number of ways, but micro-resistivity tools have proven to be effective for this purpose. Micro-resistivity tools measure borehole surface resistivity on a fine scale. The resistivity measurements can be converted into pixel intensity values to obtain a borehole wall image. Such tools were originally developed for use in conductive borehole fluids (such as water-based drilling mud). See, e.g., M. Y. Fam, R. Chemali, O. Seiler, M. Haugland, and W. F. Stewart, "Applying electrical micro-imaging logs to reservoir characterization", SPE 30608, 1995; and M. G. Prammer, M. Morys, S. Knizhnik, C. J. Conrad, W. E. Hendricks, M. S. Bittar, G. Hu, F. Hveding, K. Kenny, R. M. Shokeir, D. J. Seifert, P. M. Neumann, and S. Al-Dossari, "Field Testing of Advanced LWD Imaging Resistivity Tool" SPWLA 2007-AA. In oil-based muds, the more resistive borehole fluids inhibit such measurements due to the variability of impedance in the mud surrounding the tool. Nevertheless, a number of micro-resistivity tools for use in oil-based muds have been proposed, including those disclosed in U.S. Pat. No. 6,191,588 (Chen), U.S. Pat. No. 6,600,321 (Evans), and U.S. Pat. No. 7,098,664 (Bittar).

Though each of these designs may offer some benefits, the search continues for ever-more advantageous tool configurations. For example, one common micro-imaging approach employs multiple, separate electrodes, each having a corresponding resistor for use in measuring the current flow from that electrode. Such an approach may create unequal voltages on different electrodes due to the different current flows from the various electrodes, necessitating insulation between the electrodes and causing the tool to further depart from the ideal equipotential surface that focuses electrode currents deeper into the formation and minimizes the effect of capacitive coupling between electrodes.

BRIEF DESCRIPTION OF THE DRAWINGS

Accordingly, there are disclosed in the drawings and the following description various borehole wall imaging apparatus, systems, and methods, having a conductive wall-contacting face with multiple sensing surfaces defined by grooves in the face. In the drawings:

FIG. 1 shows an illustrative logging while drilling (LWD) environment.

FIG. 2 shows an illustrative wireline logging environment.

FIG. 3 is an illustrative borehole wall image.

FIGS. 7A-7I show various illustrative sensing surface configurations.

Figure 4:
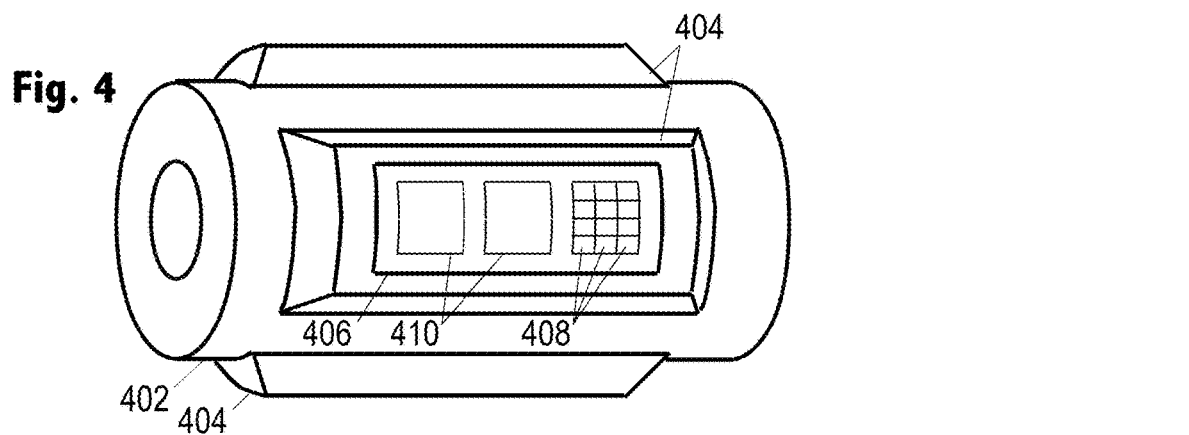
FIG. 4 is a perspective view of an illustrative partial LWD imaging tool.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

Nomenclature

Certain terms are used throughout the following description and claims to refer to particular system components. This document does not intend to distinguish between components that differ in name but not function. The terms "including" and "comprising" are used in an open-ended fashion, and thus should be interpreted to mean "including, but not limited to . . . ". The term "couple" or "couples" is intended to mean either an indirect or direct electrical, mechanical, or thermal connection. Thus, if a first device couples to a second device, that connection may be through a direct connection, or through an indirect connection via other devices and connections. Conversely, the term "connected" when unqualified should be interpreted to mean a direct connection. For an electrical connection, this term means that two elements are attached via an electrical path having essentially zero impedance.

DETAILED DESCRIPTION

Disclosed herein are various borehole imaging tools and methods having an improved high-resolution electrode configuration suitable for imaging in both water-based and oil-based muds. In at least some embodiments, the imaging tools employ a unitary conductive body to provide a wall-contacting face with grooves that define multiple sensing surfaces. Toroids may be seated in the grooves around each sensing surface for measuring the current flow through each sensing surface. Such placement enables a nearly ideal equipotential surface to be maintained and a straightforward "full coverage" electrode configuration due to a minimal electrode separation. Moreover, the disclosed configuration promises robust and reliable performance in the hostile conditions often experienced by logging while drilling (LWD) tools. This wall-contacting face can be provided on an extendable sensor pad or embedded on the outer surface of a LWD stabilizer fin.

The disclosed tools and methods are best understood in the context of the larger systems in which they operate. Accordingly, FIG. 1 shows an illustrative logging while drilling (LWD) environment. A drilling platform 102 supports a derrick 104 having a traveling block 106 for raising and lowering a drill string 108. A top drive 110 supports and rotates the drill string 108 as it is lowered into a borehole 112. The rotating drill string 108 and/or a downhole motor assembly 114 rotates a drill bit 116. As the drill bit 116 rotates, it extends the borehole 112 through various subsurface formations. The downhole motor assembly 114 may include a rotary steerable system (RSS) that enables the drilling crew to steer the borehole along a desired path. A pump 118 circulates drilling fluid through a feed pipe to the top drive 110, downhole through the interior of drill string 108, through orifices in drill bit 116, back to the surface via the annulus around drill string 108, and into a retention pit 120. The drilling fluid transports cuttings from the borehole into the retention pit 120 and aids in maintaining the borehole integrity.

The drill bit 116 and downhole motor assembly 114 form just one portion of a bottom-hole assembly that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation or azimuth), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

A LWD borehole imaging tool 122 may integrated into the bottom-hole assembly. As the drill bit 116 extends the borehole 112 through the subsurface formations, the borehole imaging tool 122 rotates and collects micro-resistivity measurements (or complex impedance measurements) that a downhole controller associates with tool position and orientation measurements to map (i.e., form an image of) the borehole wall. The measurements can be stored in internal memory and/or communicated to the surface. A telemetry sub 124 may be included in the bottom-hole assembly to maintain a communications link with the surface. Mud pulse telemetry is one common telemetry technique for transferring tool measurements to a surface interface 126 and to receive commands from the surface interface, but other telemetry techniques can also be used.

A processing unit, shown in FIG. 1 in the form of a tablet computer 128, communicates with surface interface 126 via a wired or wireless network communications link 130, and provides a graphical user interface (GUI) or other form of interface that enables a user to provide commands and to receive and optionally interact with a visual representation of the acquired measurements. The measurements may be in log form, e.g., a graph of the measurement value as a function of position along the borehole. Alternatively the measurements may be displayed in image form, as described further below with reference to FIG. 3. The processing unit can take alternative forms, including a desktop computer, a laptop computer, an embedded processor, a cloud computer, a central processing center accessible via the internet, and any combination of the foregoing.

At various times during the drilling process, the drill string 108 may be removed from the borehole, allowing wireline logging operations to be conducted as shown in FIG. 2. A logging truck 202 suspends a wireline logging tool 204 on a wireline cable 206 having conductors for transporting power to the tool and telemetry from the tool to the surface where a computer 208 acquires and stores measurement data from the logging tool 204 as a function of position along the borehole and as a function of azimuth. The logging tool 204 includes a borehole imaging portion having sensing pads 210 that slide along the borehole wall as the tool is pulled uphole. As with the LWD tool assembly, the wireline tool assembly includes an orientation module and a control/telemetry module for coordinating the operations of the various instruments and communications between the various instruments and the surface.

The borehole imaging LWD tool 122 or the wireline tool 204 collects formation impedance measurements (e.g., resistivity, conductivity, reactance, or complex impedance) that are associated with distance Z along the borehole and azimuthal angle θ around the borehole to provide a borehole wall image 302 such as that shown in FIG. 3. The surface of the borehole wall is divided into "bins", with each bin representing a pair of position Z and azimuthal angle θ values. Each time the sensing surface passes a bin, it gathers one or more measurements that can be combined with previous measurements for that bin. The combined measurements can then be processed to obtain an impedance estimate that can be displayed as a pixel color and/or a pixel intensity. Such an image often reveals bedding structures and fractures, which often exhibit a sinusoidal dependence on azimuthal angle. Such a dependence indicates that the (circular) borehole encountered the (planar) feature at an angle other than 90 degrees. We note here that such features are usually apparent even if the impedance measurements are only relative in nature rather than quantitatively accurate.

The image resolution is limited by a number of factors, including electrode size, electrode spacing, signal frequency, borehole fluid conductivity (relative to the formation), and the standoff between the borehole wall and the sensing surface. The standoff is of course a function of tool and borehole geometry, but also to some extent a function of mudcake thickness and any fluid flow layers created by motion of the tool. The use of multiple signal frequencies maximizes the range of environment in which adequate tool performance can be achieved, leaving electrode size and spacing as the major design parameters for the tool designer to optimize.

The premise underlying the present disclosure is that an optimal design should employ grooves formed in a wall-contacting face of a conductive body. Such grooves enable the wasted inter-electrode area to be minimized relative to the useful electrode area, providing a better approximation of an equipotential surface and yielding a sensing surface that is robust enough for extended downhole use.

Accordingly, FIG. 4 shows a perspective view of one portion of an illustrative LWD borehole imaging tool 402. The imaging tool 402 is a drill collar (a thick-walled steel tubular) having two or more stabilizer fins 404 that maintain the tool near the center of the borehole and, in so doing, minimize the standoff between the external faces of the stabilizer fins and the borehole wall. Embedded in the external face of at least one stabilizer fin 404, the tool includes a conductive body 406 having grooves that define multiple sensing surfaces 408 in the wall-contacting face. Around each individual sensing surface 408, the grooves form a closed loop in which a toroid can be seated to measure current flow through that sensing surface.

The sensor placement on the external surface of the stabilizer fin(s) minimizes standoff from the borehole wall and generally yields improved image resolution. Other mechanisms can be employed to minimize standoff, such as pads mounted on extendable arms or biasing springs as shown in FIG. 2. Alternatively, such arms or springs may be used to force the tool body itself against the borehole wall.

In some embodiments, the conductive body 406 is electrically insulated from the main body of imaging tool 402 so that the tool body may be employed as a distributed return electrode. In other embodiments, a remote return electrode is employed so that the tool body need not be electrically insulated from the conductive body 406.

As the imaging tool 402 rotates and progresses downhole at the drilling rate, each sensing surface 408 will trace a helical path on the borehole wall. Orientation sensors within the imaging tool 402 can be used to associate the formation impedance measurements with the sensing surfaces' positions on the borehole wall. A processing unit downhole, possibly in cooperation with a surface unit, collects the impedance measurements, orientation (azimuth) measurements, and tool position measurements, and processes the collected measurements to estimate the formation impedance at each bin and thereby create a borehole wall image.

Due to tool rotation at a rate much greater than the drill bit's rate of penetration, it is expected that one set of sensing surfaces 408 will be sufficient for resistivity imaging. However, additional sets of sensing surfaces 408 may be provided on the other stabilizers if desired for redundancy, compensation, and/or noise reduction. Such additional sets of sensing surfaces 408 enable the tool to function normally even if one set of sensing surfaces 408 is damaged. Moreover, the measurements from multiple sensing surfaces 408 within each set enable the use of signal processing techniques that compensate for noise and individual variation of the sensing surfaces' performance characteristics. Even further, the multiple sensing surfaces 408 may enable the determination of additional formation parameter measurements, such as anisotropy resistivities (horizontal resistivity, vertical resistivity, dip, and strike angles), reactance, mudcake thickness, and possibly invasion depth. Each of these may be fundamentally derived based on the spatial distribution of currents from the sensing surfaces 408 relative to the potential between the conductive body and the return electrode, as a function of signal frequency.

Figure 5:
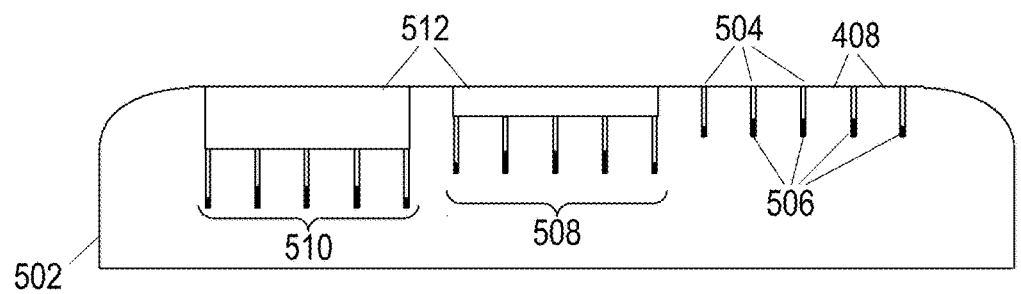
FIG. 5 is a cross-section of an illustrative pad for a wireline or LWD imaging tool.

In the illustrative implementation, the characteristic dimension of the sensing surfaces, whether stated as a diameter, the length of a side, or a center-to-center spacing, is expected to be in the range from about 1 cm to 10 cm. The width of each groove between neighboring sensor surfaces is expected to be less than 2.5 mm, with smaller widths (e.g., 1 or 2 mm) being preferred. The groove depths are preferably as shallow as possible while still assuring adequate protection for the toroids. Where significant erosion of the wall-contacting surface is expected, multiple sets of sensing surfaces 408 may be provided as shown in FIGS. 4 and 5, with each set having different groove depths. Some embodiments include protective covers 410, 512, that protect the grooves for the additional sensing surfaces 408 until the shallower sensing surfaces 408 have been largely worn away.

FIG. 5 shows a cross-sectional side view of an illustrative wireline or LWD imaging tool pad 502. The body of the pad 502 is a conductive material, such as steel. The wall-contacting face of the pad 502 has a set of grooves 504 that define closed paths around multiple sensing surfaces 408. Seated within the grooves 504 around each sensing surface 408 are corresponding toroids 506 to measure the current through each said sensing surface 408. Note that each groove 504 between two sensing surfaces 408 may be shared by the toroids 506 for those sensing surfaces 408, thereby minimizing inter-electrode spacing. A protective filler material may optionally be placed in the grooves 504 above the toroids 506 to protect and secure the toroids. The filler material should be at least somewhat resistive and should preferably be an insulating material such as an epoxy, rubber, ceramic, or plastic (e.g., poly-ether-ether-keytone) material.

As mentioned previously, additional sets of grooves 508, 510 may be provided with greater groove depths to define additional sensing surfaces 408 for use when abrasion of the wall-contacting face has worn away the original sensing surfaces 408. The grooves 508, 510 may extend the full distance to the wall-contacting face, or they may be sealed with covers 410, 512 to protect the additional sensing surfaces 408 until sufficient abrasion has occurred. Such covers 410, 512 would preferably be of the same material as the pad body.

Figure 6:
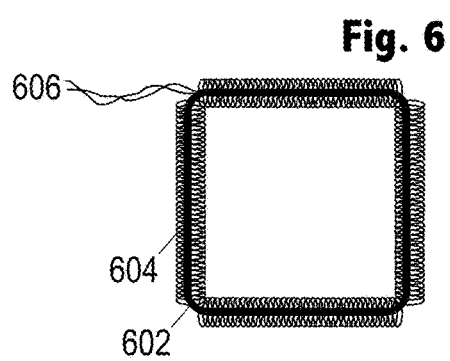
FIG. 6 shows an illustrative toroid for micro-sensing.

The grooves 504 on the wall-contacting face form a closed loop around each sensing surface 408. A toroid 506 is placed along the closed loop to measure the current through the sensing surface 408. As shown in FIG. 6, each toroid 506 includes a closed loop of wire core 602 having a high magnetic permeability (e.g., a molypermalloy powder (MPP)). A wire coil 604 is wound around the closed wire core 602 to generate a voltage in response to changes in the magnetic field along the length of wire core 602, which in turn indicates the changes in current through the area enclosed by wire core 602. The coil 604 has leads 606 that are coupled to an amplifier and analog-to-digital converter (ADC) as discussed further below. The wire of coil 604 may be a standard fine metal wire that is lacquered or electrically insulated in some fashion, and the leads 606 are twisted and optionally shielded to minimize sensitivity to any stray fields. The twisted leads may also be seated in the grooves and routed to a common feed-through aperture for connection to the tool electronics. Alternatively, multiple feed through apertures may be provided to minimize lead lengths.

Assuming some conservative parameter values, including a characteristic sensing surface dimension of 5 mm, a toroid core wire diameter of 1 mm, a magnetic permeability of 300, and 50 turns in the coil, a signal voltage of 1.2 mV may be expected. A calibration process may be used to determine the precise relationship between the sensing face current and the toroid signal voltage. This current, in turn, is related to the voltage between the sensing surface and the return electrode, the relationship being primarily determined by the formation impedance. On a perfect electrical conductor, the electrical field is perpendicular to the sensing surface, effectively localizing the formation impedance measurements to the immediate vicinity of each sensing surface.

We note that from a mechanical point of view, the groove-based definition of sensing surfaces 408 is straightforward to manufacture. The machining of grooves 504 on the surface of a metal body is a relatively low-cost process and does not increase the number of mechanical pieces. Nor will such grooves 504 adversely impact the tool's mechanical strength. One or more circular feed through apertures will be created for the toroid leads, but these are well understood and can be readily made to withstand high pressures.

FIGS. 7A-7I show various illustrative sensing surface configurations. FIG. 7A shows square sensing surfaces 702 arranged in a row, which facilitates imaging in a wireline tool configuration that lacks a high rotation rate. Notably, the negligible spacing between sensing surfaces 702 enables a single row to provide full imaging coverage of the region in front of the wireline pad, as opposed to previous imaging tool designs that require additional rows to compensate for their required inter-electrode spacing. The processing burden associated with such additional complexity can be avoided.

FIG. 7B shows square sensing surfaces 702 arranged in a column, which facilitates imaging in a LWD tool configuration having a high rotation rate. Again, the negligible spacing between sensing surfaces here and in the following configurations simplifies the processing associated with the imaging process. FIG. 7C shows square sensing surfaces 702 arranged in a row and column forming a cross or "t" shape. This configuration facilitates the detection of resistive anisotropy and serves well in both rotating and non-rotating configurations. An upper-case "T" or "L" shape would yield similar benefits.

FIG. 7D shows square sensing surfaces 702 arranged in two rows and two columns that form a square. This configuration provides the same benefits as FIG. 7C, with the added benefit of redundancy. Additional redundancy can be achieved with a full grid configuration such as that shown in FIG. 4.

While square sensing surfaces 702 are easy to fabricate and easy to analyze, the sensing surfaces can also have other shapes. For example, FIG. 7E shows an arrangement of seven hexagonal surfaces 704. For a given characteristic dimension, this arrangement offers an increased ratio of sensing surface area to groove area, albeit at the cost of increased center-to-center spacing. Conversely, FIG. 7F shows an arrangement of triangular sensing surfaces 706 having reduced center-to-center spacing at the expense of a reduction in the ratio of sensing surface area to groove area. While these configurations may offer, respectively, an increased signal to noise ratio and an increased pixel resolution, it is not expected that such advantages will outweigh the increased processing complexity for most applications. Even the arrangements of square sensing surfaces 702 are expected to yield image resolutions that are significantly better than any other currently available imaging tool designs.

We further note that the sensing surfaces need not be of uniform size. For example, FIG. 7G shows an arrangement of nested circular sensing surfaces 708, 710, and 712. Such an arrangement may facilitate measurements at multiple depths of investigation and/or enable improved standoff compensation.

Some arrangements may combine both different sizes and different shapes. FIG. 7H shows a square grid arrangement of octagonal sensing surfaces 714 and square sensing surfaces 716, with a boundary that defines a perimeter of triangular sensing surfaces 718 and small corner sensing surfaces 720. The octagonal sensing surfaces 714 have twice the area as the square sensing surfaces 716, which in turn have twice the area and the triangular sensing surfaces 718, which in turn have twice the sensing area as the corner sensing surfaces 720. This arrangement provides the same center-to-center spacing for the octagonal, square, and triangular sensing surface sub-arrangements. FIG. 7I shows a circular boundary groove around a square grid of grooves, thereby defining sensing surfaces 722 that vary in size and shape. Such arrangements may require more image processing, but may simultaneously provide measurements at multiple depths of investigation and robust imaging performance over a range of operating conditions.

Figure 8:
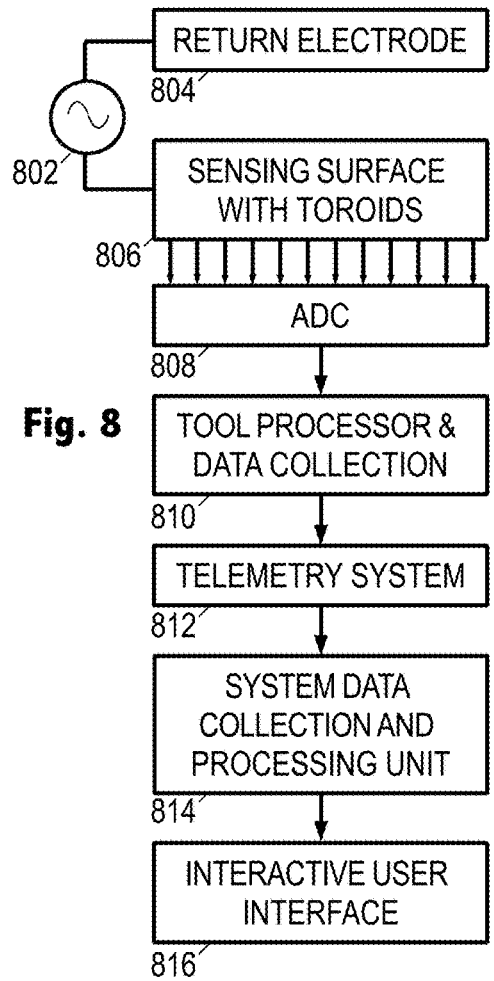
FIG. 8 is a function block diagram of an illustrative borehole imaging system.

FIG. 8 is a function block diagram of an illustrative borehole imaging system. A voltage or current source 802 drives an electrical signal between a return electrode 804 and a conductive body having a wall-contacting face with grooves defining multiple sensing surfaces 806. The electrical signal may have multiple frequency components to enable impedance measurements at different frequencies. The range of suitable frequencies may vary based on tool configuration, borehole fluid conductivity, and expected formation impedance. Toroids around the sensing surfaces each supply a signal that is amplified and digitized by an analog-to-digital converter (ADC) 808. If the source 802 is a current source, the ADC 808 also acquires a measurement of the voltage between the return electrode 804 and sensing surfaces 806. A downhole processing unit 810 stores and optionally processes the measurements to improve signal to noise ratio, e.g., by combining measurements associated with a given borehole wall image pixel. That is, the downhole processing unit may aggregate the formation impedance measurements as a function of position to obtain the pixels of a borehole wall image. Alternatively, such an operation may be performed by the surface processing unit 814 (discussed below).

The processed and/or unprocessed measurements are communicated to the surface by a telemetry system 812, which in some cases is a communications link established with the tool memory after the tool has been retrieved to the surface. In other implementations, the telemetry system 812 operates over a wireline cable or a mud-pulse telemetry channel. Other telemetry channels are also contemplated.

A processing unit 814 on the surface collects and processes the measurement data alone or in combination with information from other sources to provide the borehole wall image in visible form. As previously discussed, the surface facility may take the form of a computer in a wireline truck or mounted on a logging skid to collect the measurement data. The computer collects and processes the data in accordance with its installed software to map the formation impedance measurements into borehole wall image pixels and form an image of the borehole wall. A user interface enables a user to view and optionally interact with the borehole wall image, e.g., by adjusting the position, size, scale, and color. The image is displayed and updated as the data is collected. In some systems, the driller views the image and other available logging data and uses the data to steer the drill string into productive formations. In other systems, completions engineers analyze the image and other available logging data to construct a completion plan, including perforation regions, zone isolation packers, and controlled flow paths.

Figure 9:
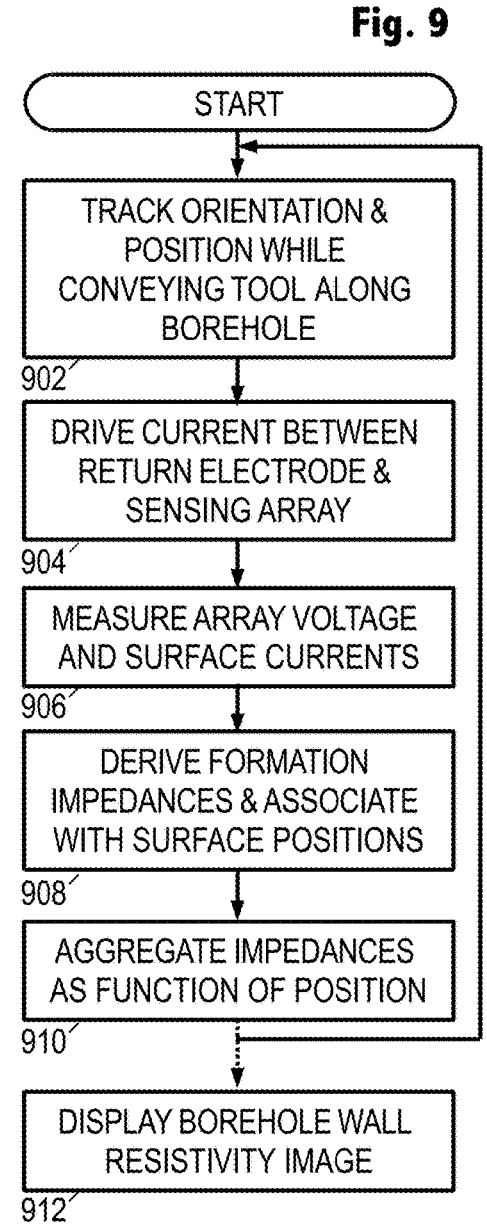
FIG. 9 is a flow diagram of an illustrative borehole imaging method.

FIG. 9 shows a flow diagram of an illustrative resistivity imaging method. In block 902, the imaging tool is conveyed along a borehole while its position and orientation are tracked. For LWD, the tool is part of the bottom hole assembly and is used to perform logging while drilling. For wireline logging, the tool is part of a sonde that is lowered to the bottom of the region of interest and the sensing surfaces are deployed to contact the wall and perform logging as the logging tool is pulled uphole at a steady rate.

To perform logging, an electrical current or voltage signal is applied between the return electrode and the sensing surfaces in block 904, and in block 906 the currents from each sensing surface are measured. Based on the ratio between the applied signal and the measured currents, the system derives a formation impedance estimate in block 908 and associates the estimate with a position on the borehole wall in front of the associated sensing surface. (Typically, a calibration factor will be employed in the derivation of a formation impedance estimate from the ratio. The calibration factors are determined during a tool calibration process before the tool is deployed.) In block 910, the system aggregates the estimates associated with each position on the borehole wall to form a borehole wall image such as that shown in FIG. 3. Blocks 902-910 are repeated until the region of interest has been logged. During or after the logging process, the system generates a visual representation of the borehole wall image in block 912. As previously mentioned, a user may rely on the image to control drilling direction or to make decisions regarding completion and production from the well.

The above-described tool embodiments can function in both oil-based and water-based borehole fluids, though it is expected that tools designed for use in oil-based fluids will generally speaking employ larger sensing surfaces and higher signal frequencies than tools designed from use in water-based borehole fluids. LWD tools may generally employ larger sensing surfaces than wireline logging tools to provide better standoff tolerance. In every case, the ability to construct a high-resolution sensing surface configuration from a unitary block of metal or other conductive material should offer robust tool performance in extreme operating environments.

The return electrode placement is a matter of design choice. Some embodiments may place a return electrode around or near the sensing surfaces, while other embodiments may employ a distributed return electrode or a remote return electrode. Examples of a distributed return electrode include a conductive tool body (particularly if separated from the sensing surface as in a wireline tool configuration) and the armor on a wireline cable. A remote return electrode may be an electrode placed on a separate stabilizer fin, or on the opposite side of the tool from the sensing surfaces, or at some axial distance from the sensing surfaces that is at least equal to the diameter of the tool body and is preferably at least an order of magnitude larger than the characteristic dimension of the sensing surfaces.

Among the various embodiments disclosed herein are:

Embodiment A: An imaging tool for use in a borehole that penetrates a subsurface formation, the tool including a conductive body having a wall-contacting face with multiple sensing surfaces each defined by one or more grooves in the wall-contacting face, each sensing surface having a corresponding toroid seated in the one or more grooves that define that sensing surface. The tool further includes at least one processing unit that obtains measurements of each toroid's response when a voltage or current is applied between the conductive body and a return electrode, and that derives a formation impedance measurement for each sensing surface based at least in part on said toroid responses. The imaging tool may further include one or more tracking instruments that track a position and orientation of the wall-contacting face, to enable the at least one processing unit to aggregate the formation impedance measurements as a function of position to obtain a borehole wall resistivity image.

Embodiment B: A resistivity imaging method that includes: driving a current or voltage between a return electrode and a conductive body having a wall-contacting face with multiple sensing surfaces each defined by one or more grooves in the wall-contacting face, each sensing surface having a corresponding toroid seated in the one or more grooves that define that sensing surface; measuring a response of each toroid to the current or voltage; deriving a formation impedance measurement for each sensing surface based at least in part on the measured responses; associating the formation impedance measurements with positions of the sensing surfaces; aggregating the formation impedance measurements as a function of position to obtain a resistivity image of a borehole wall; and providing a visual representation of said resistivity image to a user. The method may further include eroding the wall-contacting face to expose said multiple sensing surfaces.

Each of the disclosed embodiments, including Embodiments A and B, may further include one or more of the following features in any combination:

Feature 1: The impedance measurement includes formation resistivity.

Feature 2: The impedance measurement includes formation permittivity.

Feature 3: At least one of the one or more grooves defines a boundary of multiple sensing surfaces.

Feature 4: At least one of the one or more grooves is linear and said one or more grooves define a triangular or hexagonal grid of triangular sensing surfaces, a square or rectangular grid of square sensing surfaces, or a hexagonal grid of hexagonal sensing surfaces.

Feature 5: At least one of said one or more grooves is circular.

Feature 6: At least one of the multiple sensing surfaces has a different size or shape than another one of the multiple sensing surfaces.

Feature 7: Each of said one or more grooves has a width of no more than 2 mm.

Feature 8: Each of said one or more grooves has a depth of no more than 50% of a width of the sensing surfaces defined by said one or more grooves.

Feature 9: The multiple sensing surfaces are defined by grooves with a first uniform depth, and the conductive body further includes a second set of multiple sensing surfaces defined by grooves having a second uniform depth different from the first uniform depth.

Feature 10: The conductive body is part of a tool having a main body that is electrically insulated from the conductive body.

Feature 11: The conductive body is embodied in a wireline tool pad.

Feature 12: The conductive body is embodied in a logging-while-drilling tool stabilizer fin.

Numerous variations and modifications will become apparent to those skilled in the art once the above disclosure is fully appreciated. For example, though the disclosure and claims use the term "impedance", it is widely recognized that admittance (the inverse of impedance) has a one-to-one correspondence with impedance and, consequently, usually serves as a functional equivalent to impedance. As another example, the disclosed sensing surfaces and imaging techniques need not be limited to wireline and LWD tools. Other potentially suitable applications include slickline logging tools, through-bit logging tools, and casing instruments for logging-while-casing and/or monitoring of cementing operations. Through-bit logging tools in particular employ small diameter tools that would benefit strength-wise from the omission of separate sensing electrodes in favor of the unitary sensing surfaces disclosed herein. In addition, connectors in wired drill pipe or wired production tubulars may be equipped with similar sensing surfaces to monitor borehole fluid and production fluid properties. It is intended that the following claims be interpreted to embrace all such variations and modifications where applicable.

What is claimed is:

1. An imaging tool for use in a borehole that penetrates a subsurface formation, the tool comprising:
   an imaging tool pad comprising a block of metal comprising a conductive body having a wall-contacting face, wherein the wall-contacting face comprises sets of grooves that define multiple sensing surfaces, wherein the conductive body and the multiple sensing surfaces are portions of the block of metal, wherein a toroid is seated around each respective sensing surface and is located in the grooves that define each respective sensing surface, wherein the conductive body and the multiple sensing surfaces are formed from the block of metal, wherein the multiple sensing surfaces include adjacent sensing surfaces that are arranged in at least one row and at least one column to form at least a T-shaped configuration or at least an L-shaped configuration, to detect resistive anisotropy during rotation or non-rotation of the imaging tool, wherein the T-shaped configuration or the L-shaped configuration comprises at least two adjacent sensing surfaces of the adjacent sensing surfaces that share a first common groove of the sets of grooves; and
   at least one processing unit configured to obtain measurements of each toroid's response when a voltage or current is applied between the conductive body and a return electrode, and derive a formation impedance measurement for each sensing surface based at least in part on said toroid responses.

2. The tool of claim 1, wherein the at least two adjacent sensing surfaces includes five adjacent sensing surfaces, the T-shaped configuration or the L-shaped configuration comprises the five adjacent sensing surfaces which share four common grooves of the sets of grooves, the four common grooves includes the first common groove.

3. The tool of claim 1, wherein the at least two adjacent sensing surfaces includes five adjacent sensing surfaces, the T-shaped configuration or the L-shaped configuration comprises the five adjacent sensing surfaces which share four common grooves of the sets of grooves, the four common grooves includes the first common groove, wherein two of the common grooves extend in a vertical direction, wherein two of the common grooves extend in a horizontal direction, wherein a groove of the two common grooves extending in the vertical direction intersects a groove of the two common grooves extending in the horizontal direction.

4. The tool of claim 1, wherein the at least two adjacent sensing surfaces includes three adjacent sensing surfaces, the T-shaped configuration or the L-shaped configuration comprises the three adjacent sensing surfaces which share two common grooves of the sets of grooves that are perpendicular to each other, the two common grooves includes the first common groove.

5. The tool of claim 1, wherein the sets of grooves comprise a first, second, and third set of grooves, the first set of grooves is positioned deeper than the second set of grooves, the second set of grooves is positioned deeper than the third set of grooves that is configured for exposure to the borehole, wherein a first protective cover is disposed over the first set of grooves, wherein a second protective cover is disposed over the second set of grooves, wherein the first protective cover is thicker than the second protective cover, wherein the protective covers extend longitudinally along an outer surface of the imaging tool pad, to cover and protect the sets of grooves from abrasion.

6. The tool of claim 1, wherein each groove of each set of grooves has a width of no more than 2 mm.

7. The tool of claim 1, further comprising a stabilizer fin, the stabilizer fin comprising the sets of grooves.

8. The tool of claim 1, wherein the conductive body is electrically insulated from a main body of the tool.

9. The tool of claim 1, wherein the conductive body is embodied in a wireline tool pad.

10. The tool of claim 1, wherein the conductive body is embodied in a logging-while-drilling tool.

11. The tool of claim 1, wherein the at least two adjacent sensing surfaces includes three adjacent sensing surfaces, the T-shaped configuration or the L-shaped configuration comprises the three adjacent sensing surfaces which share two common grooves of the sets of grooves, the two common grooves includes the first common groove.

12. A resistivity imaging method that comprises:
   driving a current or voltage between a return electrode and a conductive body of an imaging tool pad comprising a block of metal comprising the conductive body having a wall-contacting face, wherein the wall-contacting face comprises sets of grooves that define multiple sensing surfaces, wherein the conductive body and the multiple sensing surfaces are portions of the block of metal, wherein a toroid is seated around each respective sensing surface and is located in the grooves that define each respective sensing surface, wherein the conductive body and the multiple sensing surfaces are formed from the block of metal, wherein the multiple sensing surfaces include adjacent sensing surfaces that are arranged in at least one row and at least one column to form at least a T-shaped configuration or at least an L-shaped configuration, to detect resistive anisotropy during rotation or non-rotation of the imaging tool pad, wherein the T-shaped configuration or the L-shaped configuration comprises at least two adjacent sensing surfaces of the adjacent sensing surfaces that share a first common groove of the sets of grooves;
   measuring a response of each toroid to the current or voltage;
   deriving a formation impedance measurement for each sensing surface based at least in part on the measured responses;
   associating the formation impedance measurements with positions of the sensing surfaces;
   aggregating the formation impedance measurements as a function of position to obtain a resistivity image of a borehole wall; and
   displaying a visual representation of said resistivity image.

13. The method of claim 12, further comprising:
   eroding the wall-contacting face by abrasive contact to expose said multiple sensing surfaces to the borehole wall.

14. The method of claim 12, wherein the at least two adjacent sensing surfaces includes three adjacent sensing surfaces, the T-shaped configuration or the L-shaped configuration comprises the three adjacent sensing surfaces which share two common grooves of the sets of grooves that are perpendicular to each other, the two common grooves includes the first common groove.

15. The method of claim 12, wherein the sets of grooves comprise a first, second, and third set of grooves, the first set of grooves is positioned deeper than the second set of grooves, wherein the second set of grooves is positioned deeper than the third set of grooves that is configured for exposure to a borehole, wherein a first protective cover is disposed over the first set of grooves, wherein a second protective cover is disposed over the second set of grooves, wherein the first protective cover is thicker than the second protective cover, wherein the protective covers extend longitudinally along an outer surface of the imaging tool pad, to cover and protect the sets of grooves from abrasion, the borehole including the borehole wall.

16. The method of claim 12, wherein the conductive body is embodied in a wireline tool pad.

17. The method of claim 12, wherein the T-shaped configuration or the L-shaped configuration comprises five adjacent sensing surfaces that share four common groves, wherein two of the common grooves extend in vertical directions, wherein two of the common grooves extend in horizontal directions, wherein a groove extending in a vertical direction intersects a groove extending in a horizontal direction.

18. The method of claim 12, wherein the at least two adjacent sensing surfaces includes three adjacent sensing surfaces, the T-shaped configuration or the L-shaped configuration comprises the three adjacent sensing surfaces which share two common grooves of the sets of grooves, the two common grooves includes the first common groove.

19. The method of claim 12, wherein the at least two adjacent sensing surfaces includes five adjacent sensing surfaces, the T-shaped configuration or the L-shaped configuration comprises the five adjacent sensing surfaces which share 4 common grooves of the sets of grooves, the 4 common grooves includes the first common groove.

20. A borehole imaging system that comprises:
an imaging tool that travels along a borehole that penetrates a subsurface formation, the imaging tool including:
an imaging tool pad comprising a block of metal comprising a conductive body having a wall-contacting face comprising sets of grooves that define multiple sensing surfaces, wherein the conductive body and the multiple sensing surfaces are portions of the block of metal, wherein a toroid is seated around each respective sensing surface and is located in the grooves that define each respective sensing surface, wherein the conductive body and the multiple sensing surfaces are formed from the block of metal, wherein the multiple sensing surfaces include adjacent sensing surfaces that are arranged in at least one row and at least one column to form at least a T-shaped configuration or at least an L-shaped configuration, to detect resistive anisotropy during rotation or non-rotation of the imaging tool, wherein the T-shaped configuration or the L-shaped configuration comprises at least two adjacent sensing surfaces of the adjacent sensing surfaces that share a first common groove of the sets of grooves; and
one or more tracking instruments that track a position and orientation of the wall-contacting face; and
a processing unit coupled to the imaging tool via a telemetry system to obtain said position and orientation and corresponding formation impedance measurements for each of the multiple sensing surfaces, wherein the processing unit responsively determines a borehole wall resistivity image.

21. The system of claim 20, wherein the at least two adjacent sensing surfaces includes three adjacent sensing surfaces, the T-shaped configuration or the L-shaped configuration comprises the three adjacent sensing surfaces which share two common grooves of the sets of grooves that are perpendicular to each other, the two common grooves includes the first common groove.

22. The system of claim 20, wherein the at least two adjacent sensing surfaces includes five adjacent sensing surfaces, the T-shaped configuration or the L-shaped configuration comprises the five adjacent sensing surfaces which share four common grooves of the sets of grooves, the four common grooves includes the first common groove, wherein two of the common grooves extend in a vertical direction, wherein two of the common grooves extend in a horizontal direction, wherein a groove of the two common grooves extending in the vertical direction intersects a groove of the two common grooves extending in the horizontal direction.

23. The system of claim 20, wherein the at least two adjacent sensing surfaces includes three adjacent sensing surfaces, the T-shaped configuration or the L-shaped configuration comprises the three adjacent sensing surfaces which share two common grooves of the sets of grooves, the two common grooves includes the first common groove.

24. The system of claim 20, wherein the at least two adjacent sensing surfaces includes five adjacent sensing surfaces, the T-shaped configuration or the L-shaped configuration comprises the five adjacent sensing surfaces which share 4 common grooves of the sets of grooves, the 4 common grooves includes the first common groove.

* * * * *